(12) United States Patent
Sigmund et al.

(10) Patent No.: US 8,340,644 B2
(45) Date of Patent: Dec. 25, 2012

(54) VOICEMAIL FORWARDING FUNCTIONALITY FOR COMMUNICATIONS NETWORKS

(75) Inventors: William Joseph Sigmund, Cumming, GA (US); Michael Robert Zubas, Marietta, GA (US); Brian Keith Rainer, Lawrenceville, GA (US)

(73) Assignee: AT&T Mobility II LLC, Atlanta, GA (US)

( * ) Notice: Subject to any disclaimer, the term of this patent is extended or adjusted under 35 U.S.C. 154(b) by 0 days.

(21) Appl. No.: 12/161,033

(22) PCT Filed: Apr. 25, 2008

(86) PCT No.: PCT/US2008/061592
§ 371 (c)(1),
(2), (4) Date: Jul. 16, 2008

(87) PCT Pub. No.: WO2009/029298
PCT Pub. Date: Mar. 5, 2009

(65) Prior Publication Data
US 2010/0159888 A1    Jun. 24, 2010

Related U.S. Application Data

(60) Provisional application No. 60/969,419, filed on Aug. 31, 2007.

(51) Int. Cl.
*H04M 1/10* (2006.01)
*H04M 1/725* (2006.01)
(52) U.S. Cl. .................. 455/413; 455/412.1; 455/412.2
(58) Field of Classification Search .................. 455/413, 455/412.1, 412.2
See application file for complete search history.

(56) References Cited

U.S. PATENT DOCUMENTS

| | | | |
|---|---|---|---|
| 5,329,579 A | 7/1994 | Brunson |
| 5,524,137 A | 6/1996 | Rhee |
| 5,572,578 A | 11/1996 | Lin et al. |
| 5,737,394 A | 4/1998 | Anderson et al. |
| 5,737,395 A | 4/1998 | Irribarren |
| 5,809,111 A | 9/1998 | Matthews |
| 6,005,870 A | 12/1999 | Leung et al. |
| 6,108,559 A | 8/2000 | Astrom et al. |
| 6,148,212 A | 11/2000 | Park et al. |

(Continued)

FOREIGN PATENT DOCUMENTS

EP   0 631 452   12/1994

(Continued)

OTHER PUBLICATIONS

U.S. Notice of Allowance dated May 26, 2011 in U.S. Appl. No. 12/201,945.

(Continued)

*Primary Examiner* — Kent Chang
*Assistant Examiner* — Scott Au
(74) *Attorney, Agent, or Firm* — Hope Baldauff Hartman, LLC

(57) ABSTRACT

A voicemail system (18, 30) includes a memory (38, 64) and a processor (34, 62). The memory (38, 64) can store data relating to one or more users. An incoming communication can be handled by the voicemail system (18, 30) and provided with functionality based upon a user's preferences, for example. The voicemail system (18, 30) can include functionality to allow a user to convert a voicemail message to a desired format and forward the file to one or more designated destinations. Methods (700, 800, 900, 1000) for forwarding one or messages are also disclosed.

19 Claims, 10 Drawing Sheets

U.S. PATENT DOCUMENTS

| | | |
|---|---|---|
| 6,246,871 B1 | 6/2001 | Ala-Laurila |
| 6,335,962 B1 | 1/2002 | Ali et al. |
| 6,351,523 B1 * | 2/2002 | Detlef .................. 379/88.14 |
| 6,360,272 B1 | 3/2002 | Lincke et al. |
| 6,480,885 B1 | 11/2002 | Olivier |
| 6,522,727 B1 | 2/2003 | Jones |
| 6,751,298 B2 | 6/2004 | Bhogal et al. |
| 6,829,334 B1 | 12/2004 | Zirngibl et al. |
| 6,879,847 B1 | 4/2005 | Kato |
| 6,912,275 B1 | 6/2005 | Kaplan |
| 6,937,868 B2 | 8/2005 | Himmel et al. |
| 6,981,023 B1 | 12/2005 | Hamilton et al. |
| 7,095,828 B1 | 8/2006 | Elliot et al. |
| 7,142,648 B1 * | 11/2006 | Miller .................. 379/88.23 |
| 7,171,186 B2 | 1/2007 | Miyachi et al. |
| 7,248,857 B1 | 7/2007 | Richardson et al. |
| 7,277,529 B1 | 10/2007 | Wuthnow et al. |
| 7,283,809 B1 | 10/2007 | Weinman |
| 7,369,648 B1 | 5/2008 | Chang |
| 7,680,491 B2 | 3/2010 | Zabawskyj et al. |
| 7,738,833 B2 | 6/2010 | Bettis et al. |
| 7,796,977 B2 | 9/2010 | Vander Veen |
| 7,826,831 B2 | 11/2010 | Bettis et al. |
| 7,894,580 B2 | 2/2011 | Veen et al. |
| 2002/0015403 A1 | 2/2002 | McConnell et al. |
| 2002/0037075 A1 | 3/2002 | Flanagan |
| 2002/0049768 A1 | 4/2002 | Peek et al. |
| 2002/0077098 A1 | 6/2002 | Tilks et al. |
| 2002/0112007 A1 | 8/2002 | Wood et al. |
| 2002/0115429 A1 | 8/2002 | Deluca et al. |
| 2003/0091169 A1 | 5/2003 | Cain |
| 2003/0099341 A1 | 5/2003 | Williams |
| 2004/0023643 A1 | 2/2004 | Vander Veen et al. |
| 2004/0081088 A1 | 4/2004 | Schinner et al. |
| 2004/0139471 A1 | 7/2004 | Geen et al. |
| 2004/0146147 A1 | 7/2004 | Picard et al. |
| 2004/0248594 A1 | 12/2004 | Wren |
| 2004/0252679 A1 | 12/2004 | Williams et al. |
| 2004/0264658 A1 | 12/2004 | Cline et al. |
| 2005/0089149 A1 | 4/2005 | Elias |
| 2005/0102368 A1 | 5/2005 | Forman et al. |
| 2005/0113078 A1 | 5/2005 | Deitrich |
| 2005/0186944 A1 | 8/2005 | True et al. |
| 2005/0213715 A1 | 9/2005 | Winick |
| 2006/0003745 A1 | 1/2006 | Gogic |
| 2006/0025114 A1 | 2/2006 | Bales et al. |
| 2006/0025140 A1 | 2/2006 | Bales et al. |
| 2006/0031470 A1 | 2/2006 | Chen et al. |
| 2006/0059361 A1 | 3/2006 | Paden |
| 2006/0062356 A1 | 3/2006 | Vendrow |
| 2006/0171511 A1 | 8/2006 | Liu et al. |
| 2006/0173959 A1 | 8/2006 | McKelvie et al. |
| 2006/0239419 A1 | 10/2006 | Joseph et al. |
| 2006/0251222 A1 | 11/2006 | Abramson et al. |
| 2006/0253584 A1 | 11/2006 | Dixon et al. |
| 2006/0281443 A1 | 12/2006 | Chen et al. |
| 2007/0038483 A1 | 2/2007 | Wood |
| 2007/0066284 A1 | 3/2007 | Gatzke et al. |
| 2007/0127632 A1 | 6/2007 | Swingle et al. |
| 2007/0127663 A1 | 6/2007 | Bae |
| 2007/0140443 A1 * | 6/2007 | Woodring .................. 379/88.06 |
| 2007/0143106 A1 | 6/2007 | Dunsmuir |
| 2007/0173233 A1 | 7/2007 | Vander Veen et al. |
| 2007/0180032 A1 | 8/2007 | Pearson |
| 2007/0180504 A1 | 8/2007 | Hung |
| 2007/0207785 A1 | 9/2007 | Chatterjee et al. |
| 2007/0213050 A1 | 9/2007 | Jiang |
| 2007/0223666 A1 | 9/2007 | Teague |
| 2007/0287453 A1 | 12/2007 | Wang |
| 2008/0008163 A1 | 1/2008 | Castell et al. |
| 2008/0008299 A1 | 1/2008 | Didcock et al. |
| 2008/0056459 A1 | 3/2008 | Vallier et al. |
| 2008/0062246 A1 | 3/2008 | Woodworth et al. |
| 2008/0062938 A1 | 3/2008 | Gil-soo et al. |
| 2008/0081609 A1 | 4/2008 | Burgan et al. |
| 2008/0140767 A1 | 6/2008 | Rao et al. |
| 2008/0167007 A1 | 7/2008 | Novick et al. |
| 2008/0167010 A1 | 7/2008 | Novick et al. |
| 2008/0167014 A1 | 7/2008 | Novick et al. |
| 2008/0188204 A1 | 8/2008 | Gavner |
| 2008/0200152 A1 | 8/2008 | Moore |
| 2008/0207176 A1 | 8/2008 | Brackbill et al. |
| 2008/0260118 A1 | 10/2008 | Lyle |
| 2008/0298459 A1 | 12/2008 | Yang et al. |
| 2009/0149220 A1 | 6/2009 | Camilleri et al. |
| 2009/0239507 A1 | 9/2009 | Sigmund et al. |
| 2009/0253407 A1 | 10/2009 | Sigmund et al. |
| 2009/0253412 A1 | 10/2009 | Sigmund et al. |
| 2009/0253413 A1 | 10/2009 | Sigmund et al. |
| 2010/0159886 A1 | 6/2010 | Sigmund et al. |
| 2010/0159889 A1 | 6/2010 | Sigmund et al. |
| 2010/0159890 A1 | 6/2010 | Sigmund et al. |
| 2010/0159891 A1 | 6/2010 | Sigmund et al. |
| 2010/0166161 A1 | 7/2010 | Dhawan et al. |
| 2010/0167699 A1 | 7/2010 | Sigmund et al. |
| 2010/0189229 A1 | 7/2010 | Sigmund et al. |
| 2010/0195807 A1 | 8/2010 | Sigmund et al. |
| 2010/0222024 A1 | 9/2010 | Sigmund et al. |
| 2011/0085646 A1 | 4/2011 | Sigmund et al. |

FOREIGN PATENT DOCUMENTS

| | | |
|---|---|---|
| EP | 1 113 631 | 7/2001 |
| EP | 1 434 415 | 6/2004 |
| EP | 1 599 022 | 11/2005 |
| KR | 2005 0001246 | 1/2005 |
| WO | WO 97/45991 | 12/1997 |
| WO | WO 98/03005 | 1/1998 |
| WO | WO 00/73947 | 12/2000 |
| WO | WO 02/065745 | 8/2002 |
| WO | WO 2004/046895 | 6/2004 |
| WO | WO 2007/081929 | 7/2007 |
| WO | WO 2007/095510 | 8/2007 |
| WO | WO 2007/096866 | 8/2007 |
| WO | WO 2008/034555 | 3/2008 |
| WO | WO 2009/029296 | 3/2009 |
| WO | WO 2009/029297 | 3/2009 |
| WO | WO 2009/029298 | 3/2009 |
| WO | WO 2009/029313 | 3/2009 |
| WO | WO 2009/029314 | 3/2009 |
| WO | WO 2009/029323 | 3/2009 |
| WO | WO 2009/029324 | 3/2009 |
| WO | WO 2009/029328 | 3/2009 |
| WO | WO 2009/029330 | 3/2009 |
| WO | WO 2010/002382 | 1/2010 |

OTHER PUBLICATIONS

U.S. Official Action dated Sep. 19, 2011 in U.S. Appl. No. 12/477,971.
U.S. Official Action dated Apr. 25, 2012 in U.S. Appl. No. 12/477,971.
U.S. Official Action dated Oct. 13, 2011 in U.S. Appl. No. 12/485,335.
U.S. Official Action dated Apr. 27, 2012 in U.S. Appl. No. 12/160,931.
U.S. Official Action dated Dec. 22, 2010 in U.S. Appl. No. 12/160,940.
U.S. Official Action dated May 31, 2011 in U.S. Appl. No. 12/160,940.
U.S. Official Action dated Apr. 25, 2012 in U.S. Appl. No. 12/160,946.
U.S. Official Action dated Nov. 4, 2011 in U.S. Appl. No. 12/160,956.
U.S. Official Action dated Jan. 12, 2011 in U.S. Appl. No. 12/161,021.
U.S. Official Action dated Jun. 1, 2011 in U.S. Appl. No. 12/161,021.
U.S. Official Action dated Dec. 15, 2011 in U.S. Appl. No. 12/161,021.
U.S. Official Action dated Nov. 29, 2010 in U.S. Appl. No. 12/161,027.
U.S. Official Action dated May 10, 2011 in U.S. Appl. No. 12/161,027.
U.S. Official Action dated Nov. 23, 2011 in U.S. Appl. No. 12/161,027.
U.S. Official Action dated Dec. 23, 2010 in U.S. Appl. No. 12/161,035.

U.S. Official Action dated Jun. 2, 2011 in U.S. Appl. No. 12/161,035.
U.S. Official Action dated Dec. 2, 2011 in U.S. Appl. No. 12/161,035.
U.S. Official Action dated Jan. 24, 2011 in U.S. Appl. No. 12/161,064.
U.S. Official Action dated Jul. 8, 2011 in U.S. Appl. No. 12/161,064.
U.S. Official Action dated Jan. 30, 2012 in U.S. Appl. No. 12/161,064.
U.S. Official Action dated Jan. 19, 2011 in U.S. Appl. No. 12/161,076.
U.S. Official Action dated Jul. 1, 2011 in U.S. Appl. No. 12/161,076.
U.S. Official Action dated Jan. 17, 2012 in U.S. Appl. No. 12/161,076.
International Search Report & Written Opinion dated Sep. 18, 2008 in PCT Application PCT/US08/67612.
International Search Report & Written Opinion dated Aug. 1, 2008 in PCT Application PCT/US08/61493.
International Search Report & Written Opinion dated Nov. 12, 2008 in PCT Application PCT/US08/65046.
International Search Report & Written Opinion dated Mar. 13, 2009 in PCT Application PCT/US08/68738.
International Search Report & Written Opinion dated Oct. 29, 2008 in PCT Application PCT/US08/67176.
International Search Report & Written Opinion dated Sep. 4, 2008 in PCT Application PCT/US08/54074.
International Search Report & Written Opinion dated Sep. 3, 2008 in PCT Application PCT/US08/61592.
International Search Report & Written Opinion dated Sep. 4, 2008 in PCT Application PCT/US08/67152.
International Search Report & Written Opinion dated Nov. 6, 2008 in PCT Application PCT/US08/67591.
International Search Report & Written Opinion dated Aug. 28, 2008 in PCT Application PCT/US08/61437.
U.S. Office Action dated May 22, 2012 in U.S. Appl. No. 12/485,335.
U.S. Office Action dated Apr. 24, 2012 in U.S. Appl. No. 12/160,940.
U.S. Office Action dated Jun. 6, 2012 in U.S. Appl. No. 12/160,956.
U.S. Notice of Allowance dated Jun. 21, 2012 in U.S. Appl. No. 12/161,021.
U.S. Office Action dated Jul. 18, 2012 in U.S. Appl. No. 12/161,035.
U.S. Office Action dated Jul. 30, 2012 in U.S. Appl. No. 12/161,027.
U.S. Notice of Allowance dated Jul. 17, 2012 in U.S. Appl. No. 12/161,076.
U.S. Office Action dated Aug. 30, 2012 in U.S. Appl. No. 12/160,931.
U.S. Office Action dated Sep. 14, 2012 in U.S. Appl. No. 12/161,064.
U.S. Office Action dated Oct. 4, 2012 in U.S. Appl. No. 12/485,484.
U.S. Office Action dated Oct. 2, 2012 in U.S. Appl. No. 12/485,961.
U.S. Office Action dated Oct. 11, 2012 in U.S. Appl. No. 12/160,946.

* cited by examiner

VOICEMAIL FORWARDING FUNCTIONALITY FOR COMMUNICATIONS NETWORKS

RELATED APPLICATION

This application claims priority to U.S. Provisional Patent Application No. 60/969,419, filed Aug. 31, 2007, the entirety of which is hereby incorporated by reference.

TECHNICAL FIELD

The present disclosure relates generally to voicemail platforms for communications devices. More particularly, the present disclosure relates to a dynamic voicemail forwarding system for communications networks.

BACKGROUND

Voicemail is a popular telephone service feature, and is often included in the price paid for telephone service. When a called line with voicemail functionality does not answer or is busy, a call can be handled by a voicemail system. A voicemail system can store recordings and/or announcements for a user. When a call is passed to a voicemail system, the voicemail system can play one or more recordings and/or announcements for the calling party or a generic message and can prompt the calling party to leave a message, for example, a spoken message. The voicemail system can record the calling party's message and store the message, for example, as audio data in a storage device. Call data associated with the message, for example, the calling party's telephone number, the date and time of the call, and the like, can also be stored by the voicemail system and associated with the stored message. Some voicemail systems also allow calling parties to leave alphanumeric messages for a called party. In any event, the voicemail system can store the message or data and associated call data.

Among the close to 100 million cellular telephone service users in the United States, a growing trend includes replacing terrestrial telephone services with cellular telephone services. In the event that a user determines to replace other telephone service with a cellular telephone line, a cellular telephone service may be the user's only telephone number. As such, voicemail system associated with cellular telephone services can be relied upon by many users to report all missed telephone calls, whether those calls relate to personal or business matters.

The increased reliance upon cellular telephone service has been accompanied by a corresponding increased demand and increased reliance upon other cellular telephone features and functionality, for example, text messaging, email, Internet browsing, data transfer, and other features. As reliance upon and demand for cellular telephone services and voicemail increases, demand for enhanced voicemail services will likely continue to experience a corresponding increase.

SUMMARY

A system for providing voicemail forwarding functionality for a communications network can include a memory for storing instructions and messages, a processor for executing the instructions stored in the memory, and a network interface. The instructions stored in the memory can include a voicemail application for obtaining and storing one or more messages from a calling party and a voicemail forwarding application for forwarding at least one message to a recipient.

The forwarding application can include instructions for converting at least one message from a first file format to a second file format. The instructions in the memory can also include at least one algorithm used by the voicemail forwarding application to convert the at least one message from the first file format to the second file format. The memory can also store a billing application, as well as user data. The user data can include greetings, announcements, preferences, and the like.

A method for forwarding at least one message using a voicemail forwarding application of a voicemail system can include receiving, at the voicemail system, instructions to forward at least one message to a recipient. The voicemail system can determine at least one data format in which to forward at least a portion of the at least one message. The voicemail system can also determine at least one recipient to which forward the at least a portion of the at least one message. The voicemail system can send the at least a portion of the at least one message to the at least one recipient. The data format can be one or more audio formats, text formats, video formats, combinations thereof, and the like. The voicemail system formats an email, MMS message, or the like, to which to attach the message as a file. In some embodiments, the voicemail system converts to text the message to be forwarded. The voicemail system can format and send an SMS message, email message, MMS message, and the like, that includes the text created from the converted message. In some embodiments, the voicemail system establishes a data session with a destination, i.e., the recipient's, device and transfers the message using the data connection. The voicemail system can be an application, program, hardware, software, or a combination thereof, on a communications network or on a portable communications device.

A method for allowing at least one recipient to retrieve at least a portion of at least one message stored by a voicemail system can include receiving, at the voicemail system, instructions to allow retrieval of at least a portion of at least one message by at least one recipient. The voicemail system can determine the data format in which to store the at least a portion of at least one message. The voicemail system can also determine the at least one recipient of at least a portion of the at least one message. The voicemail system can send to the at least one recipient, instructions for accessing the at least a portion of the at least one message. The at least a portion of the at least one message can be stored in at least one audio format, at least one text format, at least one video format, a combination thereof, and the like. Other portions of the message, for example headers, can be stored in a network-recognizable format. The voicemail system can format a third party access area for retrieving the at least a portion of the at least one message. The voicemail system can send a hyperlink to a file location corresponding to the stored at least a portion of the at least one message. The voicemail system can also send a hyperlink to a web page with a hyperlink to a file location corresponding to the stored at least a portion of the at least one message.

A mobile device with voicemail forwarding functionality can include a memory configured to store instructions and messages, a processor for executing the instructions stored in the memory, and a network interface for transferring data to and from at least one cellular network. The network interface can include antennae, a receiver, a transmitter, a receiver, a short range radio device, and the like. The instructions stored in the memory can include a voicemail application for storing one or more voicemail messages. The messages can be obtained by an external voicemail system and passed to the voicemail application for storage. Alternatively, the voicemail application can obtain and store the messages. The instructions stored in the memory can also include a voicemail forwarding application for forwarding at least one voicemail message to one or more recipients or destinations. The voicemail forwarding application can include instructions for converting at least one voicemail message from a first file format to a second file format. The memory can store one or more algorithms for use in converting message format. The memory can also store instructions for formatting and sending messages, for example, instructions for attaching the message to an email message, MMS message, and the like. The memory can also include other applications, such as, for example, translators, speech to text converters, SMS messaging applications, and the like.

These and additional features of the present disclosure will become apparent with reference to the attached drawings, wherein:

DESCRIPTION

As required, detailed embodiments of the present disclosure are disclosed herein. It must be understood that the disclosed embodiments are merely exemplary examples of the disclosure that may be embodied in various and alternative forms, and combinations thereof. As used herein, the word "exemplary" is used expansively to refer to embodiments that serve as an illustration, specimen, model or pattern. The figures are not necessarily to scale and some features may be exaggerated or minimized to show details of particular components. In other instances, well-known components, systems, materials or methods have not been described in detail in order to avoid obscuring the present disclosure. Therefore, specific structural and functional details disclosed herein are not to be interpreted as limiting, but merely as a basis for the claims and as a representative basis for teaching one skilled in the art to variously employ the present disclosure.

Figure 1:
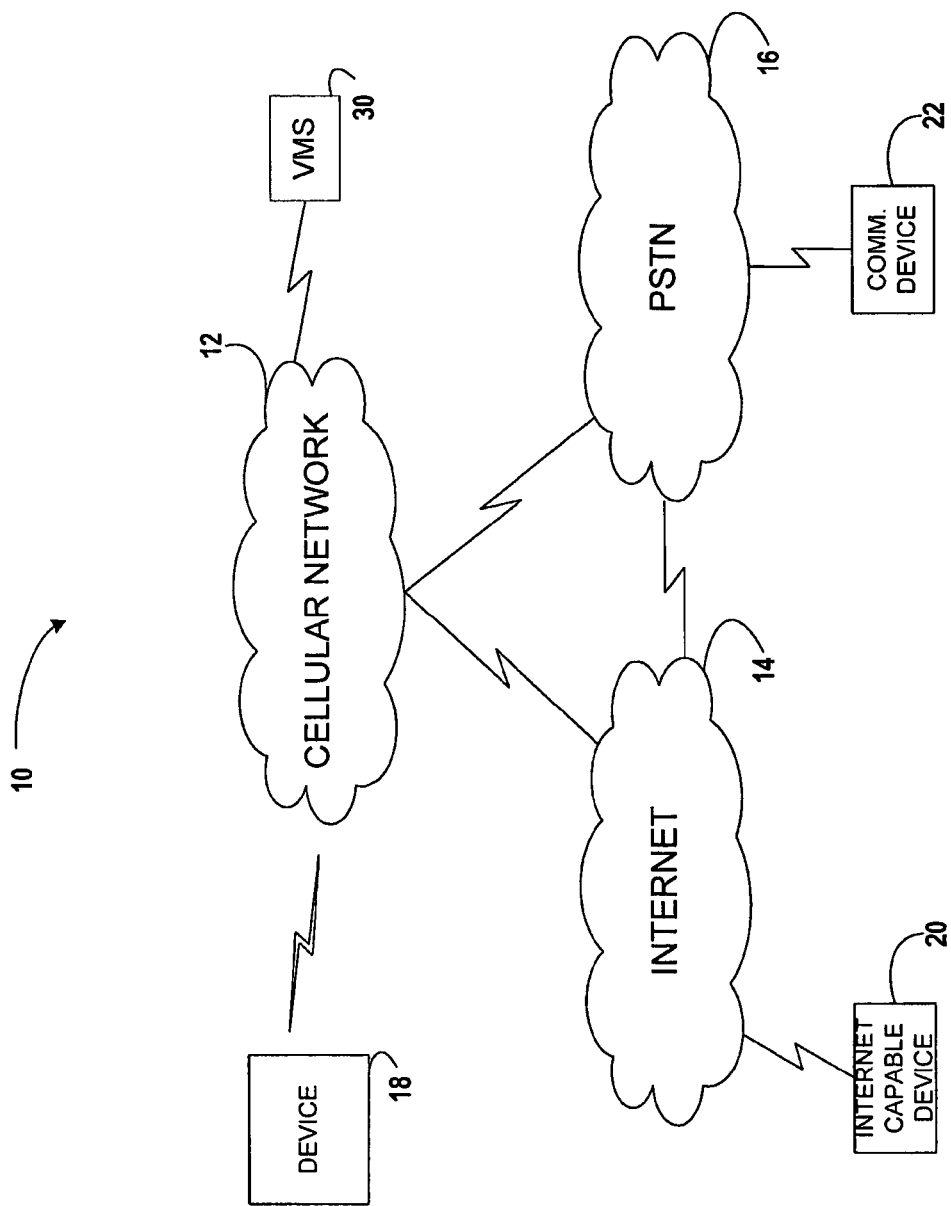
FIG. 1 schematically illustrates an exemplary communications network with which embodiments of the present disclosure can be implemented.

Referring now to the drawings in which like numerals represent like elements throughout the several views, FIG. 1 schematically illustrates an exemplary communications network 10. The illustrated exemplary network 10 includes a cellular network 12, the Internet 14, and a PSTN 16. The cellular network 12 can include various components such as, but not limited to, base transceiver stations (BTSs), base station controllers (BSCs), mobile switching centers (MSCs), short message service centers (SMSCs), multimedia messaging service centers (MMSCs), home location registers (HLRs), charging platforms, traditional voicemail platforms, visual voicemail platforms, GPRS core network components, and the like. A mobile device 18, such as, for example, a cellular telephone, a user equipment, a mobile terminal, a PDA, a handheld computer, or a combination thereof, can be operatively connected to the cellular network 12. While the illustrated mobile device 18 resembles an Apple® iPhone™, it should be understood that any device and/or network can be used.

The cellular network 12 can be configured as a 2G GSM (Global System for Mobile communications) network and provide data communications via GPRS (General Packet Radio Service), and EDGE (Enhanced Data rates for GSM Evolution). Additionally, the cellular network 12 can be configured as a 3G UMTS (Universal Mobile Telecommunications System) network and can provide data communications via the HSPA (High-Speed Packet Access) protocol family, for example, HSDPA (High-Speed Downlink Packet Access), EUL (Enhanced Uplink) or otherwise termed HSUPA (High-Speed Uplink Packet Access), and HSPA+ (Evolved HSPA). The cellular network 12 is also compatible with future mobile communications standards including, but not limited to, pre-4G and 4G, for example.

The illustrated cellular network 12 is shown in communication with the Internet 14 and a PSTN 16, though it will be appreciated that this is not necessarily the case. One or more Internet-capable devices 20, for example, a PC, a laptop, a portable device, a smart phone, or any other suitable device, can communicate with one or more cellular networks 12, or even a device 18 connected thereto, through the Internet 14. It will also be appreciated that the internet device 20 can communicate with the Internet 14, through the PSTN 16, the cellular network 12, or a combination thereof. As illustrated, a communications device 22, for example, a telephone, facsimile machine, modem, computer, or the like, can be in communication with the PSTN 16, and therethrough to the Internet 14 and/or the cellular network 12. It will be appreciated that the communications device 22 can be an Internet-capable device, and can be substantially similar to the Internet-capable device 20.

The cellular network 12 can include a wide array of nodes, devices, subsystems, networks, subnetworks, software, hardware, applications, and the like. For example, a cellular network 12 can include one or more messaging systems or nodes, for example, short message service centers (SMSCs), multimedia message service centers (MMSCs), voicemail systems, content delivery servers, and the like. A cellular network 12 can also include various radios and nodes for passing voice, data, and combinations thereof to and from radio transceivers, networks, and the Internet 14.

The illustrated communications network 10 includes a voicemail system 30 (VMS). The VMS 30 can be hardware, software, and/or a combination thereof, and includes traditional voicemail systems as well as visual voicemail systems. While the VMS 30 is illustrated as being in communication with the cellular network 12, it will be appreciated that the VMS 30 can be hardware and/or software residing on one or more of the cellular network 12, the PSTN 16, the mobile device 18, the Internet 14, and that the VMS 30 can be accessible by and/or through multiple devices and networks, including private networks, which are not illustrated in FIG. 1. It should be appreciated that substantially all of the functionality described with reference to the communications network 10 can be performed by the cellular network 12.

Figure 2:
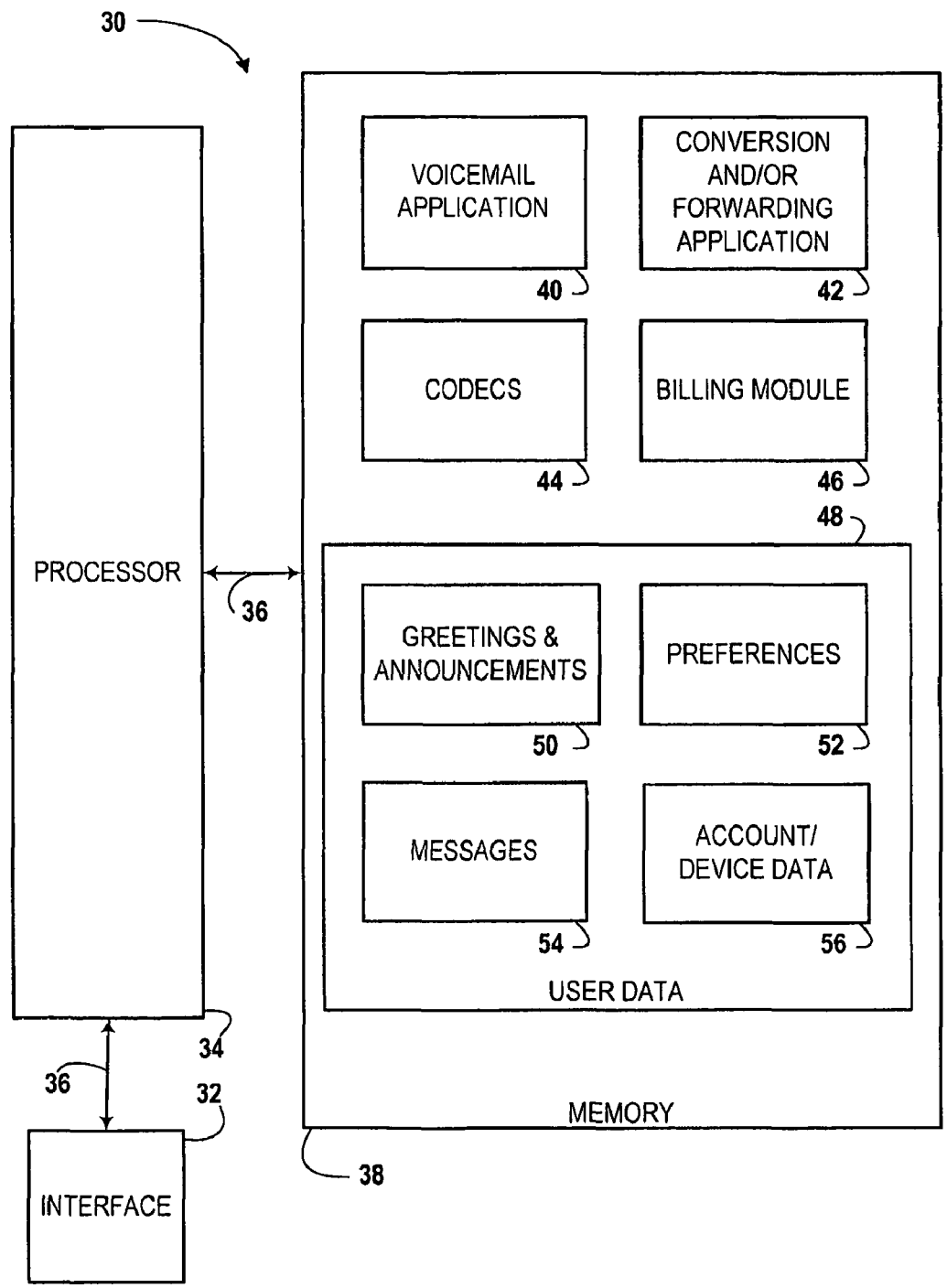
FIG. 2 schematically illustrates a voicemail system according to an exemplary embodiment of the present disclosure.

FIG. 2, illustrates a schematic block diagram of a VMS 30 according to an exemplary embodiment of the present disclosure. The illustrated VMS 30 includes a communications network interface 32 that is operatively linked and in communication with a processor 34 via a data/memory bus 36. The communications network interface 32 allows the VMS 30 to communicate with one or more components of the communications network 10, or any device connected thereto or residing thereon. It will be appreciated that if the VMS 30 resides on mobile device, for example, the device 18, that the communications network interface 32 can be a communications component of the device, for example, a short range radio device, a transceiver, receiver, transmitter, antennae, or combinations thereof. The processor 34 is operatively linked and in communication with a memory 38 via a data/memory bus 36.

The word "memory," as used herein to describe the memory 38, collectively refers to all memory types associated with the VMS 30 such as, but not limited to, processor registers, processor cache, random access memory (RAM), other volatile memory forms, and non-volatile, semi-permanent or permanent memory types; for example, tape-based media, optical media, flash media, hard disks, combinations thereof, and the like. While the memory 38 is illustrated as residing proximate the processor 34, it should be understood that the memory 38 can be a remotely accessed storage system, for example, a server on the Internet 14, a remote hard disk drive, a removable storage medium, combinations thereof, and the like. Moreover, the memory 38 is intended to encompass network memory and/or other storage devices in wired or wireless communication with the VMS 30, which may utilize the communications network interface 32 to facilitate such communication. Thus, any of the data, applications, and/or software described below can be stored within the memory 38 and/or accessed via network connections to other data processing systems (not shown) that may include a local area network (LAN), a metropolitan area network (MAN), or a wide area network (WAN), for example. Accordingly, the present disclosure may operate on the VMS 30, wherein the VMS 30 is configured as a server to one or more client data processing systems as dictated by a client/server model.

The illustrated memory 38 can include one or more voicemail applications 40 (VMA), one or more voicemail conversion and/or forwarding applications 42 (VMFA), one or more CODECs 44, and one or more billing modules 46. Additionally, the memory 38 can include other data, software, instructions, applications, and the like, for example, an operating system (not illustrated), hardware data, firmware, and the like. Although the VMA 40, the VMFA 42, the CODECs 44, and the billing modules 46 are shown as separate entities, it should be appreciated that substantially all of the functionality of the VMS 30 modules can be performed by a single application. The memory 38 can also include user data 48.

The VMA 40 can include instructions, programs, applications, software, and the like, for handling communications passed to the VMS 30. The VMA 40 can examine the communication passed to the VMS 30 to determine, for example, the called party, i.e., the user and the mailbox associated with the user. The VMS 30 can then retrieve the user's greetings or a default greeting for the user and record a message from the calling party for the called party. A message, as will be explained below in more detail, can include an audio recording, a text message, a video recording, an alphanumeric page, headers, and the like. The VMA 40 can also support message retrieval by a user or a user's device, as well as providing a telephone user interface (TUI) for calling parties and users. It will be appreciated that the VMA 40 can, but does not necessarily, operate in a manner substantially similar to traditional voicemail and visual voicemail systems.

The VMFA 42 can include instructions, programs, applications, software and the like, for optionally converting and/or forwarding messages 54, or portions thereof. The VMFA 42 can convert messages, or portions thereof, to alternative formats, as will be explained in more detail below. For example, the VMFA 42 can convert an audio file to an alternative audio format, from audio to text, or both. The VMFA 42 can, if desired, use an algorithm, for example, a CODEC, to encode or decode audio files and/or convert audio files to alternative formats. The VMFA 42 can also forward messages, or portions thereof. The messages, or portions thereof, can be forwarded by the VMFA 42 in any format. The VMFA 42 can also format the delivery method of the messages, or portion(s) thereof. For example, the VMFA 42 can format an email message and attach a message, or a portion thereof, to the email message. Other conversion formats and delivery methods will be described below in more detail.

The CODECs 44 can include algorithms, programs, and/or software that is used by a hardware device or software to compress or decompress audio data. It will be appreciated that the term "CODEC" refers to a compressor-decompressor algorithm, a coder-decoder algorithm, and/or a compression/decompression algorithm. In the illustrated VMS 30, the CODECs 44 can be used by the VMFA 42 to convert audio data. The CODECs 44 can include algorithms that direct computer programs or hardware devices, for example, how to represent an audio signal in a manner that uses a minimum amount of data while retaining the original audio file quality. The use of the CODECs 44 can reduce the amount of storage space needed to store an audio file. Similarly, the CODECs 44 can be used to minimize the bandwidth required to transmit an audio file to, from, or through the communications network 10.

The billing module 46 can be used to track, collect, and/or report activities of the VMS 30 for billing purposes. For example, the billing module 46 can track how many messages and/or how much data is sent and received by the VMS 30 and report this information to a billing system of the communications network 10, for example. Billing can be pre-paid or post-paid. The voicemail forwarding service can be charged on any desired basis, including, but not limited to, a per-use basis, a per-byte basis, a per-kilobyte basis, and the like. Additionally, or in the alternative, the voicemail forwarding service can be billed as a flat fee, for example, as part of service package, or the like.

The user data 48 can include various types of data. For purposes of illustration, and not limitation, the user data 48 is illustrated in. FIG. 2 and described herein as including a number of categories of data that can be associated with one or more users of the VMS 30. Exemplary categories of user data 48 can include, for example, greetings and announcements 50, user preferences 52, messages 54, account/device data 56, and other data (not illustrated). The user data 48 can be configured, stored, synced, updated, and deleted by any number of users, network operators, or other authorized parties. It will be appreciated that greetings 50, preferences 52, messages 54, and account/device data 56, can be updated by a user of the VMS 30, or by any other authorized party. The messages 54 can be updated and stored by the VMS 30, for example, when a calling party leaves a message for the user or when a message is sent to the user.

The greetings and announcements 50 (greetings) can include greetings, announcements, schedules, and the like, and can be associated with a user. The greetings 50 can be configured by the user, by a network node, by the VMS 30, or by any other authorized party or device. For example, a user can record a greeting, schedule, or announcement and store the greeting 50 on the VMS 30. As such, the greetings 50 can be audio data that is stored in the VMS memory 38 as an audio file. Additionally, the greetings 50 can be default messages that are created by the network or a network node and tailored for a user. The greetings 50 can be stored in any desired format. If the greetings 50 are stored as audio data, exemplary formats include, but are not limited to, waveform audio (WAV), audio interchange file format (AIFF), RAW, encoded in GSM CODEC, advanced audio coding (AAC), MPEG-1 audio layer 3 (MP3), MPEG-4 Part 14 (MP4), Windows® media audio (WMA), RealAudio (RA), free lossless audio codec (FLAC), Apple® lossless encoder (ALE), i.e., Apple® lossless audio codec (ALAC), and other open and proprietary audio formats.

The preferences 52 can include data relating to a user's preferences for the VMS 30. The preferences 52 can include, for example, an indication as to which functions the user wishes to make available to calling parties, conversion formats supported by the user's device, forwarding destination information, e.g., telephone numbers, email addresses, facsimile numbers, and the like, message time limits, voice to text settings, the number of rings allowed prior to passing a call to the VMS 30, message waiting indicator preferences, download settings, data routing preferences, and the like. It will be understood that users can customize many other functions and options of the VMS 30, including, for example, options for bypassing the VMS 30 and sending incoming calls for a user to another system, phone number, and/or user, forwarding numbers, voice or data delivery options, including formats, size, delivery times, email addresses, and the like, as well as other preferences.

The messages 54 can include audio files created by recordings made by the VMS 30, text created by a calling party or by the VMS 30, headers associated with audio or text, and the like. For example, if a calling party leaves a spoken message for a called party, an audio file associated with a message 54 can be created by recording the spoken message. The audio files, if any, can be stored in any desired format, including, but not limited to, WAV, AIFF, RAW, encoded in GSM CODEC, AAC, MP3, MP4, WMA, RA, FLAC, ALE, ALAC, and other open and proprietary audio formats. Text data of the message 54 can include text created by the VMS 30, for example, using a speech to text converter. The text data can also include text created by or entered by the calling party, for example, an alphanumeric message, a callback number, a text message, and the like. The headers of the message 54 can include call data such as the MSISDN, the length of the message, the size of the text file, if applicable, the time and date of the call, priority information, and the like. In addition to the file formats discussed above, the audio files, headers, and text can be stored in any network-recognizable format. The various data associated with a message 54 can be stored by the VMS 30 in any manner. If desired, the various data can be correlated to associate an audio file, a text file, and headers with each other as part of a message 54.

Account/device data 56 can include data relating to the user's account and/or device, including, but not limited to, the user's subscription plan and the user's device capabilities. For example, the VMS 30 can be in communication with one or more billing platforms, subscriber databases, other network nodes, and the like, to receive the account/device data 56 relating to a user's subscription plan, usage, and billing information. Additionally, the account/device data 56 can inform the VMS 30 of the features the user's device supports by indicating the IMEI, serial number, carrier, software version(s), firmware, carrier-specific applications, combinations thereof, or the like. The account/device data 56 can pass-through the VMS 30, or can be stored, at least temporarily. The VMS 30 can use the account/device data 56 to determine file formats and functionality that should be provided to a calling party or a user based upon billing, device, network, or other considerations. Additionally, billing considerations can be used to tailor options presented to a calling party or a user. For example, a user can instruct the VMS 30 to disable the ability to send text messages or text files through the VMS 30. Additionally, or in the alternative, a notification can be sent from a billing platform to the VMS 30 directly and the VMS 30 can disable functionality automatically. A user can be given the ability to override deactivation of any desired features or functionality.

Figure 3:
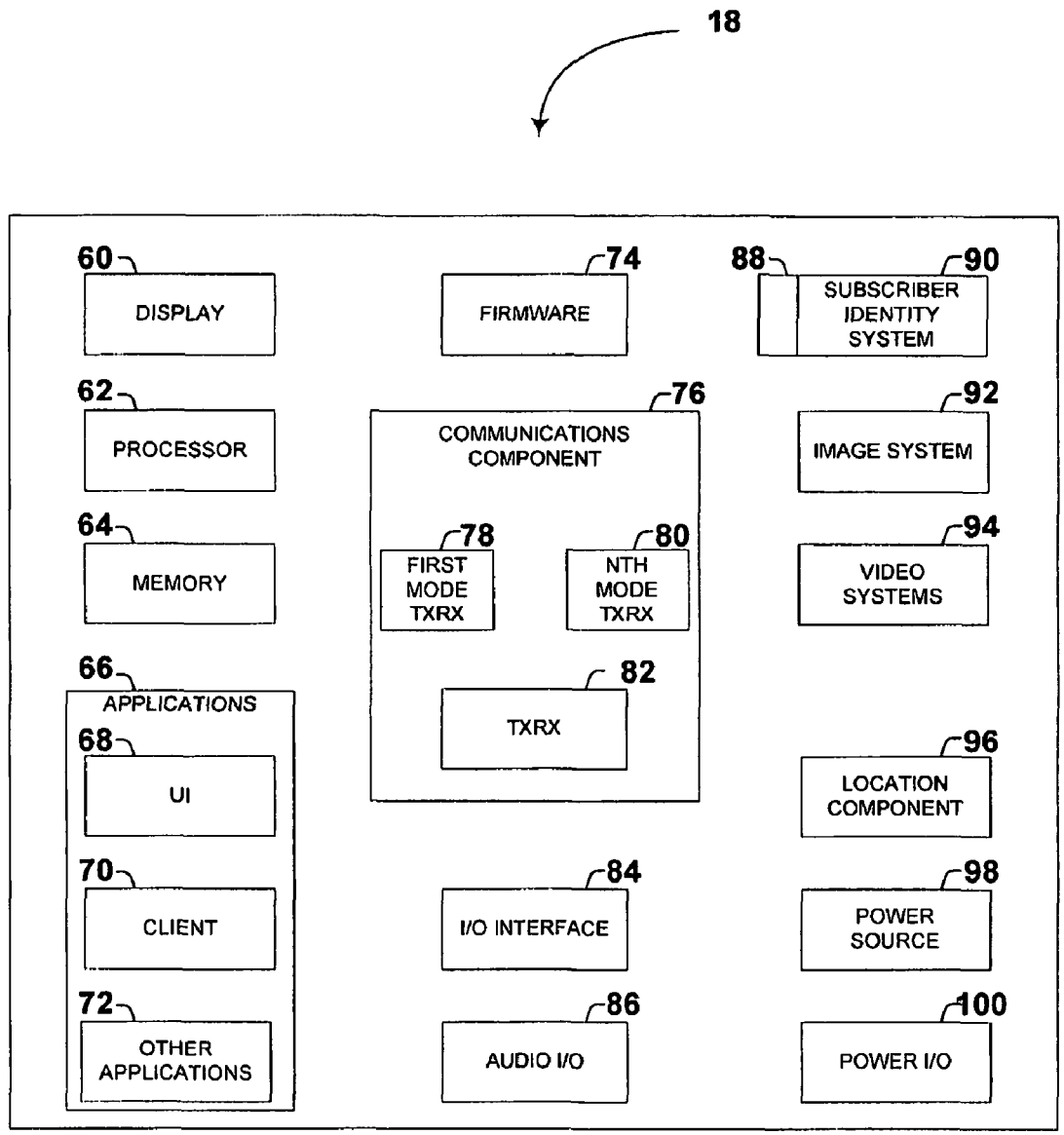
FIG. 3 schematically illustrates a block diagram of an exemplary mobile device for use with exemplary embodiments of the present disclosure.

FIG. 3 illustrates a schematic block diagram of an exemplary mobile communications device 18 for use in accordance with an exemplary embodiment of the present disclosure. Although no connections are shown between the components illustrated in FIG. 3, the components can interact with each other to carry out device functions.

As illustrated, the mobile communications device 18 can be a multimode handset. It should be understood that FIG. 3 and the following description are intended to provide a brief, general description of a suitable environment in which the various aspects of an embodiment of the present disclosure can be implemented. While the description includes a general context of computer-executable instructions, the present disclosure can also be implemented in combination with other program modules and/or as a combination of hardware and software. The term "application," or variants thereof, is used expansively herein to include routines, program modules, programs, components, data structures, and the like. Applications can be implemented on various system configurations, including single-processor or multiprocessor systems, minicomputers, mainframe computers, personal computers, hand-held computing devices, microprocessor-based, programmable consumer electronics, combinations thereof, and the like.

The device 18 can include a variety of computer readable media, including volatile media, non-volatile media, removable media, and non-removable media. Computer-readable media can include device storage media and communication media. Storage media can include volatile and/or non-volatile, removable and/or non-removable media such as, for example, RAM, ROM, EEPROM, flash memory or other memory technology, CD ROM, DVD, or other optical disk storage, magnetic tape, magnetic disk storage or other magnetic storage devices, or any other medium that can be used to store the desired information and that can be accessed by the device 18.

The device 18 can include a display 60 for displaying multimedia such as, for example, text, images, video, telephony functions such as Caller ID data, setup functions, menus, music, metadata, messages, wallpaper, graphics; internet content, device status, preferences settings, map data, location data, and the like. The device 18 can include a processor 62 for controlling, and/or processing data. A memory 64 can interface with the processor 62 for the storage of data and/or applications 66. An application 66 can include, for example, video player software, voicemail software, conversion software, audio playback software, music player software, email software, messaging software, combinations thereof, and the like. The application 66 can also include a user interface (UI) application 68. The UI application 68 can interface with a client 70 (e.g., an operating system) to facilitate user interaction with device functionality and data, for example, answering/initiating calls, entering/deleting data, configuring settings, address book manipulation, multimode interaction, and the like. The applications 66 can include other applications 72 such as, for example, firmware, visual voicemail software, add-ons, plug-ins, voice recognition, call voice processing, voice recording, messaging, e-mail processing, video processing, image processing, converting and forwarding voicemail files, music play, combinations thereof, and the like, as well as subsystems and/or components. The applications 66 can be stored in the memory 64 and/or in a firmware 74, and can be executed by the processor 62. The firmware 74 can also store code for execution during initialization of the device 18.

A communications component 76 can interface with the processor 62 to facilitate wired/wireless communications with external systems including, for example, cellular networks, VoIP networks, LAN, WAN, MAN, PAN, that can be implemented using Wi-Fi, Wi-Max, combinations and/or improvements thereof, and the like. The communications component 76 can also include a multimode communications subsystem for providing cellular communications via different cellular technologies. For example, a first cellular transceiver 78 can operate in one mode, for example, GSM, and an Nth transceiver 80 can operate in a different mode, for example UMTS. While only two transceivers 78, 80 are illustrated, it should be appreciated that a plurality of transceivers can be included. The communications component 76 can also include a transceiver 82 for unlicensed communications using technology such as, for example, WI-FI, WI-MAX, BLUETOOTH, infrared, IRDA, NFC, RF, and the like. The communications component 76 can also facilitate communications reception from terrestrial radio networks, digital satellite radio networks, Internet-based radio services networks, combinations thereof, and the like. The communications component 76 can process data from a network such as, for example, the Internet, a corporate intranet, a home broadband network, and the like, via an ISP, DSL provider, or broadband provider.

An input/output (I/O) interface 84 can be provided for input/output of data and/or signals. The I/O interface 84 can be a hardwire connection, such as, for example, a USB, mini-USB, audio jack, PS2, IEEE 1394, serial, parallel, Ethernet (RJ48), RJ11, and the like, and can accept other I/O devices such as, for example, a keyboard, keypad, mouse, interface tether, stylus pen, printer, thumb drive, touch screen, touch pad, trackball, joy stick, microphones, remote control devices, monitor, display, LCD, combinations thereof, and the like. It will be appreciated that the I/O interface 84 can be used for communications between the device and a network or local device, instead of, or in addition to, the communications component 76.

Audio capabilities can be provided by an audio I/O component 86 that can include a speaker for the output of audio signals and a microphone to collect audio signals. The device 18 can include a slot interface 88 for accommodating a subscriber identity system 90 such as, for example, a SIM or universal SIM (USIM). The subscriber identity system 90 instead can be manufactured into the device 18, thereby obviating the need for a slot interface 88. The device 18 can include an image capture and processing system 92. Photos and/or videos can be obtained via an associated image capture subsystem of the image system 92, for example, a camera. The device 18 can also include a video component 94 for processing, recording, and/or transmitting video content.

A location component 96, can be included to send and/or receive signals such as, for example, GPS data, triangulation data, combinations thereof, and the like. The device 18 can use the received data to identify its location or can transmit data used by other devices to determine the device 18 location. The device 18 can include a power source 98 such as batteries and/or other power subsystem (AC or DC). The power source 98 can interface with an external power system or charging equipment via a power I/O component 100.

Figure 4:
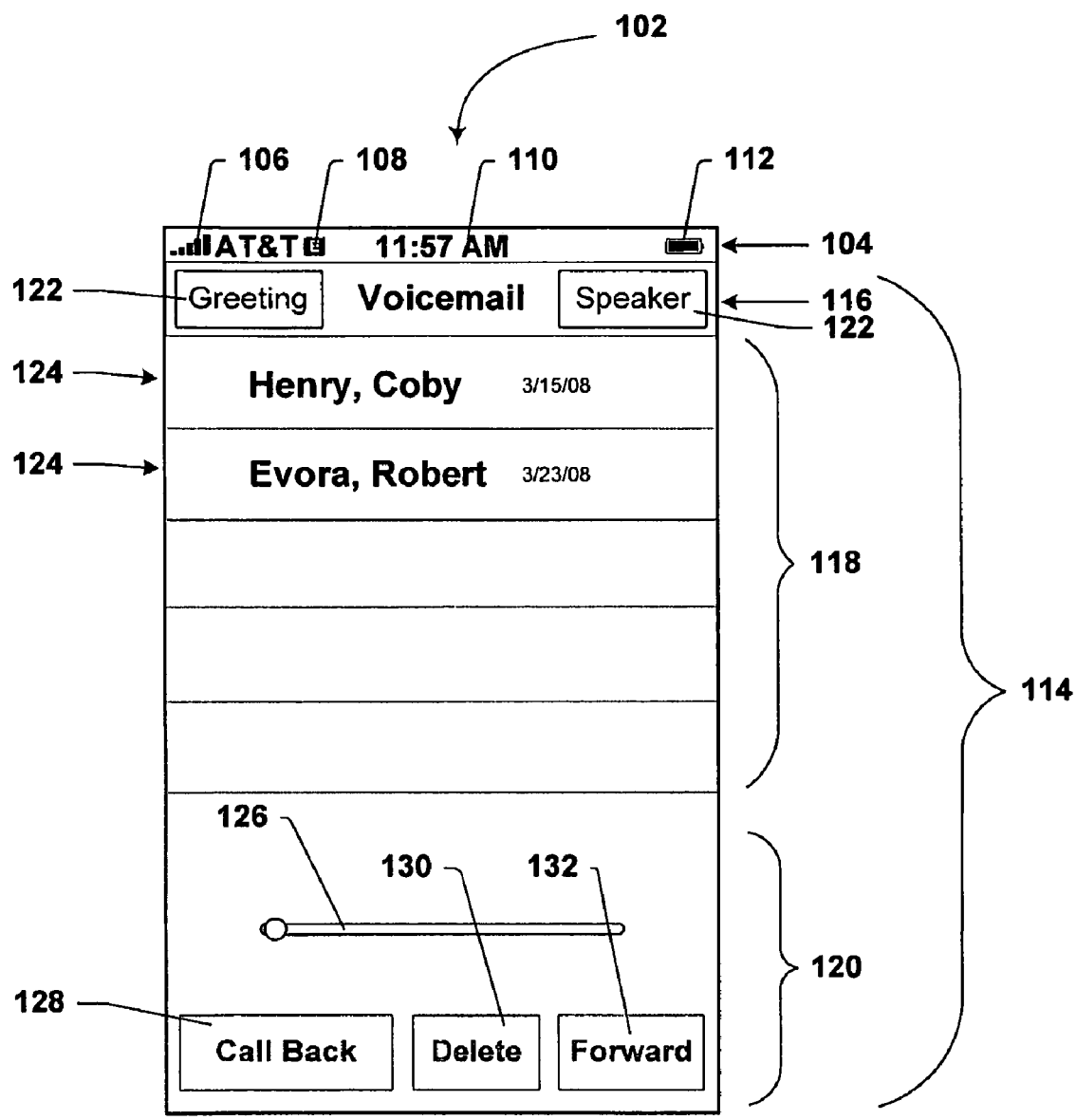
FIG. 4 illustrates an exemplary graphical user interface for providing an option for a user to forward voicemail messages, according to an exemplary embodiment of the present disclosure.

FIG. 4 illustrates an exemplary representative image from a GUI 102 for a device 18, according to an exemplary embodiment of the disclosure. As illustrated, the GUI 102 can include operational information 104 for the device 18. The operational information 104 can include network information, for example, a signal meter 106 for displaying the measured strength of a network signal, and a network indicator 108 for displaying the current network to which the device 18 is connected. In the illustrated GUI 102, the device 18 is indicating a maximum signal strength and that the device 18 is currently connected to the AT&T EDGE (Enhanced Data rates for GSM Evolution) network. It should be understood that this indication is exemplary only. The GUI 102 can be used on devices operating on other networks and operated by other carriers. The operational information 104 can also include, for example, the time of day 110, a battery meter 112, as well as other indicators, including, but not limited to, a short range radio communications device indicator, an alarm indicator, and the like.

In the illustrated GUI 102, an exemplary visual voicemail application user interface (VVMAUI) is currently displayed. The illustrated VVMAUI 114 includes a title and menu portion 116, a mailbox contents portion 118, and a control portion 120. As illustrated, the title and menu portion 116 can include one or more options 122, though the illustrated options are merely exemplary. The mailbox contents portion 118 can display one or more messages 124. The control portion 120 can include one or more controls. The illustrated control portion 120 includes a time slider bar 126, a callback option 128, a delete option 130, and a forward option 132. In the illustrated GUI 102, the control portion 120 is illustrated as being in a deactivated state. In the exemplary illustrated GUI 102, the control portion 120 can be activated when a desired message is selected for review by the user.

Figure 5:
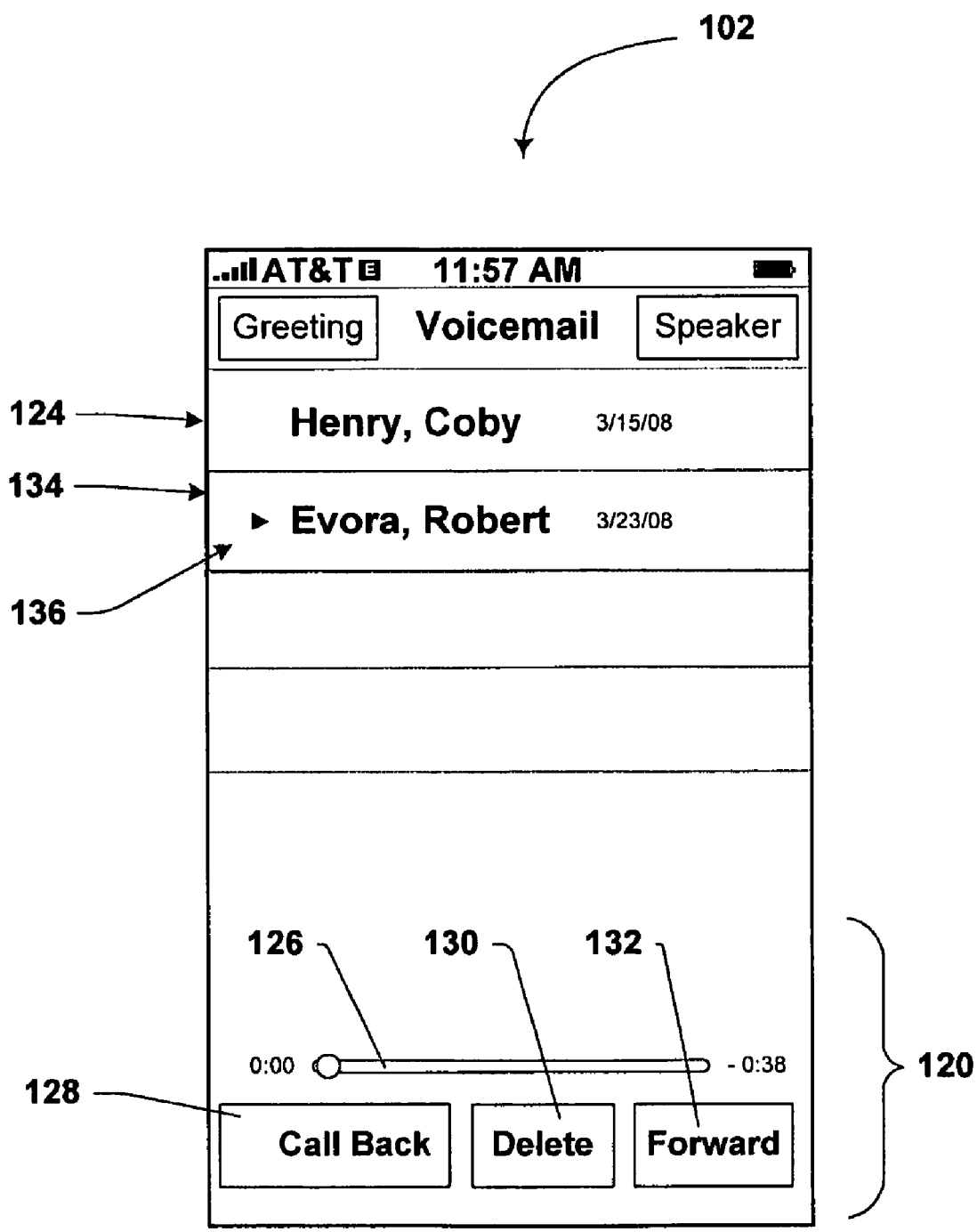
FIG. 5 illustrates another exemplary graphical user interface for providing an option for a user to forward voicemail messages, according to an exemplary embodiment of the present disclosure.

FIG. 5 illustrates another exemplary representative image from a GUI 102 for a device 18, according to an exemplary embodiment of the disclosure. In FIG. 5, a selected message 134 is illustrated as selected and the control portion 120 is illustrated as being in an activated state. The time slider bar 126 shows the length of the selected message 134. As illustrated, the selected message 134 is currently at the 0:00 position and 38 seconds remain in the selected message 134. In the illustrated GUI 102, an option 136 to play the selected message 134 appears to the left of the selected message 134. It is noted that the appearance of the unselected message 124 can be substantially similar to the appearance illustrated in FIG. 4.

In FIG. 5, the callback option 128, the delete option 130, and the forward option 132 are all illustrated as being activated. Upon selection of the selected message 134, the user can select the callback option 128 to initiate a telephone call to the party who left the message. Alternatively, the user can select the delete option 130 to delete the selected message 134. Alternatively, the user can select the forward option 132 to forward the selected message 134 to a recipient. Several embodiments of the conversion and forwarding functionality of an exemplary VMS 30 will be described in greater detail below with reference to FIGS. 7-10.

Figure 6:
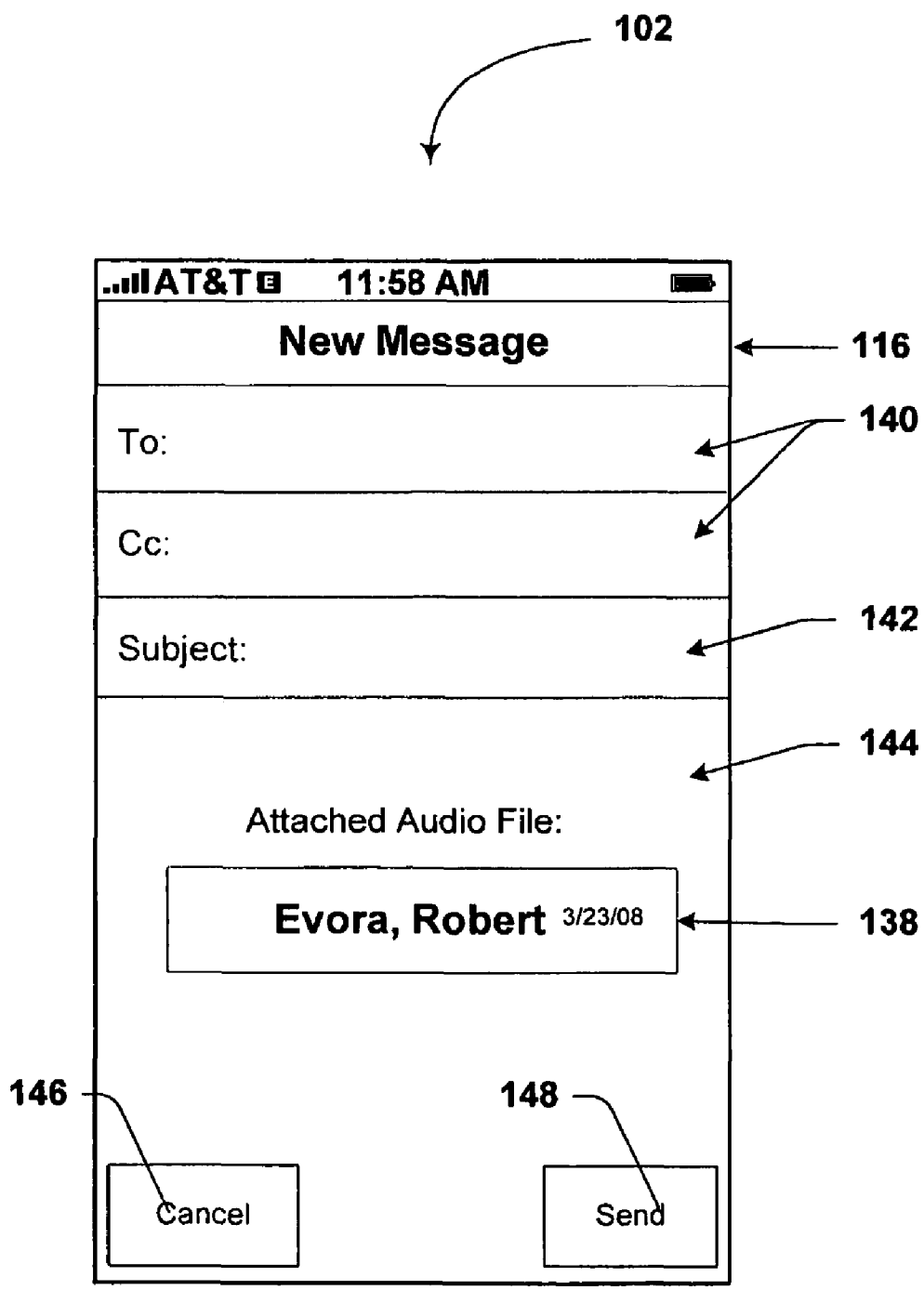
FIG. 6 illustrates another exemplary graphical user interface for providing an option for a user to forward voicemail messages, according to an exemplary embodiment of the present disclosure.

FIG. 6 illustrates another exemplary representative image from a GUI 102 for a device 18, according to an exemplary embodiment of the disclosure. In FIG. 6, the user has selected the forward option 132 to forward the selected message 134. In this embodiment, selection by the user of the forward option 132 converts the selected message 134 into a desired format and attaches a file 138 corresponding to the selected message 134 to an email message.

The user can be provided with one or more address fields 140, a subject line 142, and a message body portion 144. It will be appreciated that some or all of the address fields 140, the subject line 142, and the message body portion 144 can be automatically populated. The GUI 102 is illustrated as including a cancel option 146 and a send option 148, though additional or alternative options are possible and contemplated. While the illustrated embodiment illustrates the selected message 134 as attached to the outgoing email message as an audio file 138, it will be appreciated that the selected message 134 can be converted to text and attached to or can be an SMS message, an MMS message, an email message, a text file, and the like. These and other options will be explained in more detail below with reference to FIGS. 7-10.

Figure 7:
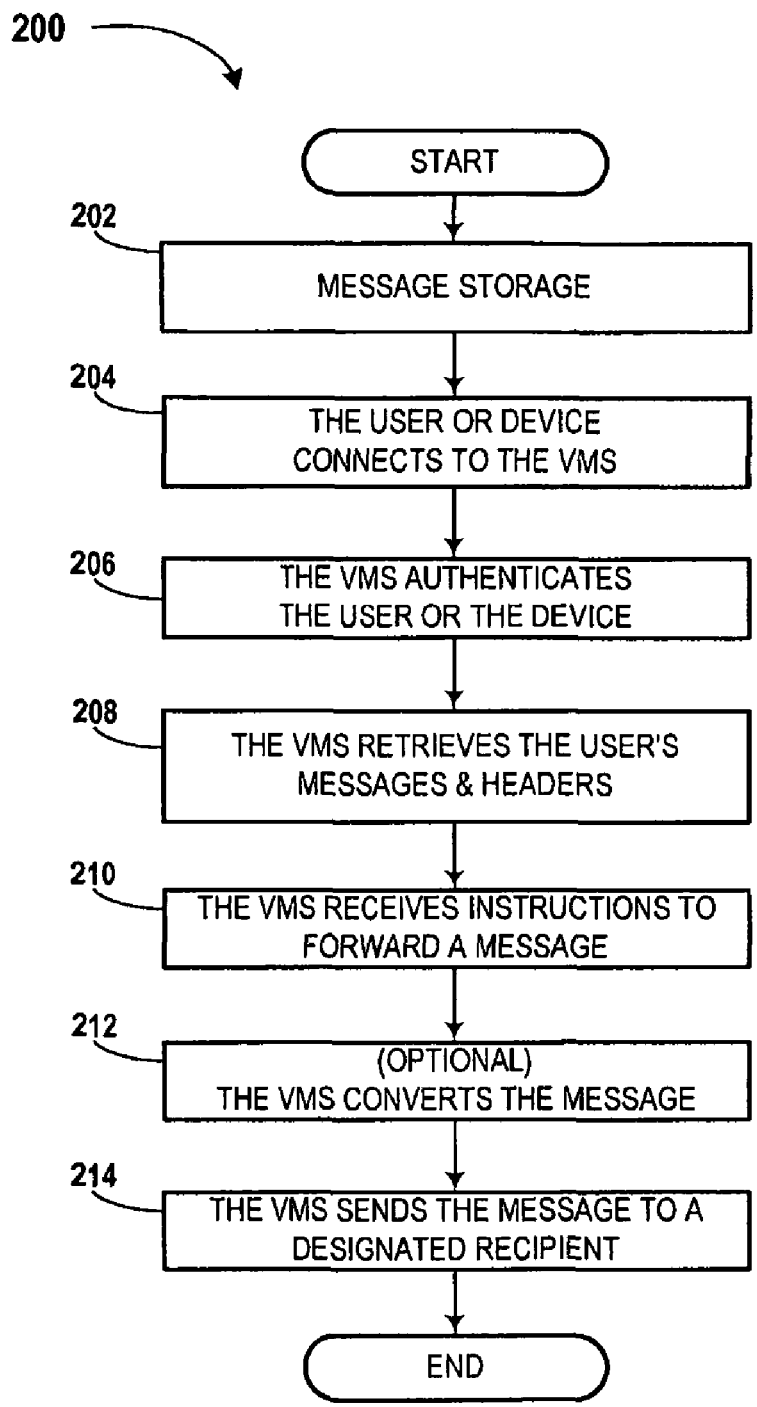
FIG. 7 schematically illustrates a method for storing and forwarding a voicemail message, according to an exemplary embodiment of the present disclosure.

FIG. 7 schematically illustrates a method 200 for forwarding a voicemail message according to an exemplary embodiment of the disclosure. It should be understood that the steps of the method 200 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 200 can be ended at any time. Some or all steps of this process, and/or substantially equivalent steps, can be performed by execution of computer-readable instructions included on a computer readable medium.

To avoid complicating the disclosure, the following description will describe in general terms performance of a method embodying some concepts of the disclosure. In reading the description of the several methods herein, and not only the exemplary method of FIG. 7, it should be understood that a user can interact with a VMS 30 using a telephone user interface (TUI), a GUI, or another UI. Alternatively, the user can interact with the device 18, and the device 18 can handle all communication needed to instruct the VMS 30 how to carry out the user's desired actions. Therefore, DMTF-driven TUIs, icon-based GUIs, touch-sensitive screen GUIs, voice-driven TUIs, and the like are included in the following description and are included in the scope of the appended claims.

As illustrated in block 202, a VMS 30 can store one or more messages 54. As explained above with reference to FIG. 2, the message 54 can include various types of data, including, but not limited to, audio data, video data, headers, text, and the like, and the VMS 30 can correlate the various data, if desired. It will be appreciated that the message storage referred to with reference to block 202 can occur any number of times, or not at all, before a user of the VMS 30 retrieves any messages. Additionally, it will be appreciated that voicemail setup and configuration of mailbox preferences, and the like, are not illustrated for the sake of brevity, though such steps can occur at any time.

As illustrated in block 204, a user or the device 18 can connect to the VMS 30. A user or the device 18 can connect to the VMS 30 by a voice connection, by a data connection, or over the internet, for example. Once the user or the device 18 connects to the VMS 30, the VMS 30 can authenticate a user or the device 18 to determine if the user or the device 18 is authorized to access the requested mailbox, as illustrated in block 206. Although not illustrated, a user or the device 18 may be given several attempts to authenticate to the VMS 30, or the VMS 30 can terminate a call after an unsuccessful authentication attempt. For the remainder of the illustrated method 200, it will be assumed that the user or the device 18 authenticates successfully to the VMS 30.

As illustrated in block 208, the VMS 30 can retrieve one or more messages 54 for the user or the device 18. As explained above, the messages 54 can include audio, video, text, headers, and other data. In some embodiments, the user's device 18 connects to the VMS 30 and retrieves only the message headers. If a user selects a particular message, the message content, for example, the audio, video, text, or other data, can be retrieved by the user's device 18. In other embodiments, the user's device 18 retrieves all of the data for all of the messages 54. In still other embodiments, the data for messages 54 remains on the VMS 30 during a message retrieval by a user or the device 18.

At block 210, the VMS 30 can receive instructions to forward one or more messages 54, or portion(s) thereof. The instructions to forward a message 54 can be received in a number of ways, as briefly mentioned above. For example, a voice command, a DTMF tone, a data message, or the like, corresponding to a desired action, can be passed to and executed by the VMS 30. It should also be appreciated that a device 18 can include a GUI for presenting options to a user and for receiving the user's option selection. When a user makes a selection, the device 18 can pass data corresponding to the selected option to the VMS 30 for execution. In the illustrated method 200, the user has indicated that one or more messages 54 are to be forwarded to a recipient and the instruction has been received by the VMS 30. The instructions to forward the message can optionally include contact information for a designated recipient, or the exemplary method 200 can optionally include prompting a user or the device 18 to select or designate a recipient. Alternatively, the VMS 30 can optionally be configured to forward messages 54 to a default address, for example, the user's email address, or the user's device 18.

At block 212, the VMS 30 can optionally convert one or more messages 54, or portion(s) thereof, into a desired or designated format. The desired or designated format can be set by a user, by the device 18, by the VMS 30, by the designated recipient, or by any other authorized party. In one embodiment, the VMS 30 sets the default message conversion format. In another embodiment, the user designates the message conversion format and stores the choice in the preferences 52. In another embodiment, the user can set the conversion format each time a message 54 is forwarded. In another embodiment, the VMS 30 identifies the conversion format by retrieving information relating to the recipient device, for example, the recipient telephone number, the recipient device IMEI, the recipient's network, the recipient's IP address, the recipient's location, and the like. As such, it should be appreciated that a determination step can be included in the illustrated method 200 in which the user, the VMS 30, or another element, designates or determines the conversion format for the message 54, or portion thereof. Alternatively, as explained above, the message 54, or a portion thereof, can be forwarded without being converted into an alternative file format.

At block 214, the VMS 30 can forward the message 54, or a portion thereof, to a recipient. As briefly described above, the message recipient can be designated by the user, by the VMS 30, selected by the user, and the like. The VMS 30 can optionally convert the message 54, or a portion thereof, as explained above, and forward the message in the designated format. In one embodiment, the VMS 30 is configured to send an email message with a message 54, or a portion thereof, as an attachment. In another embodiment, the VMS 30 is configured to send an MMS message with the message 54, or a portion thereof, as an attachment. In another embodiment, the VMS 30 is configured to send the message 54, or a portion thereof, in a proprietary message format that is recognizable by software on the recipient device. In another embodiment, the VMS 30 converts an audio component of the message 54 to text and sends the text to a designated recipient as the body of an email message, as an SMS message, as an MMS message, as a text file, or other readable message. An audio file can optionally be attached to the readable message. The illustrated method 200 can include verification steps to ensure that the message is received by the recipient device. The method 200 can end.

Figure 8:
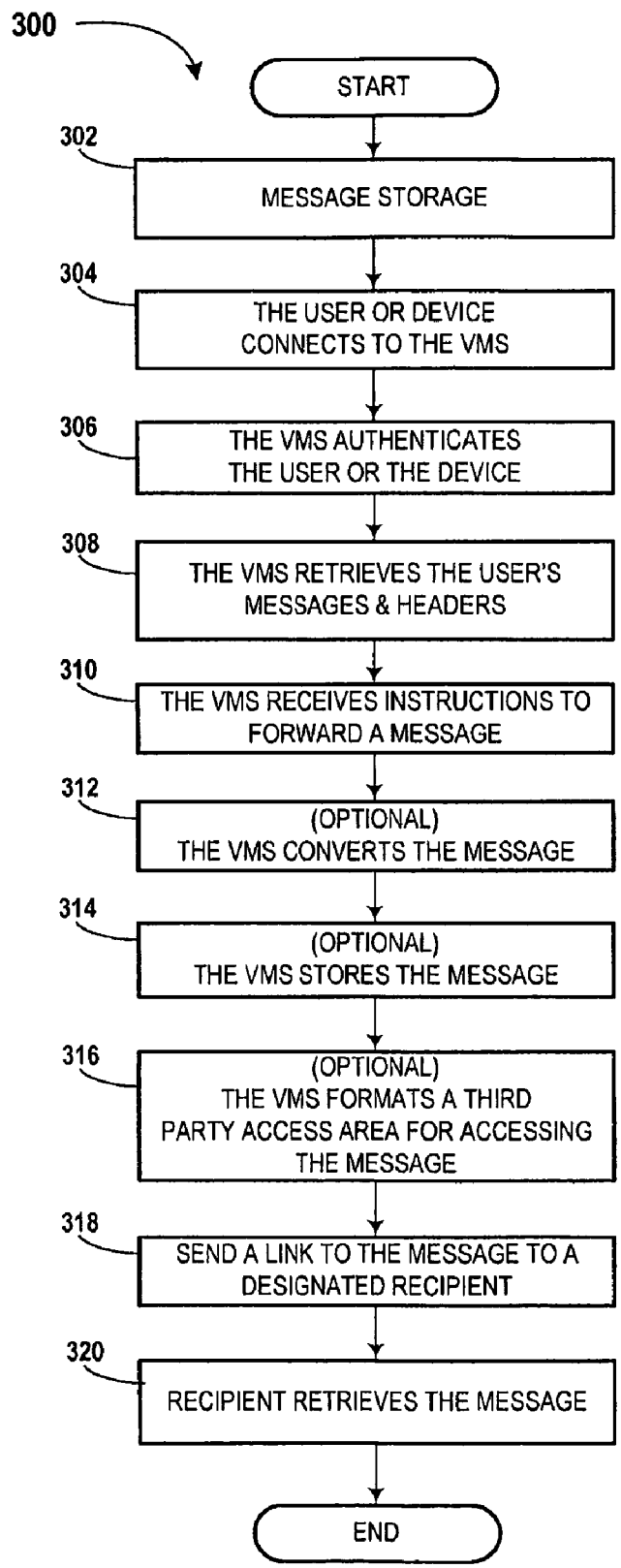
FIG. 8 schematically illustrates a method for storing and forwarding a voicemail message, according to an alternative exemplary embodiment of the present disclosure.

FIG. 8 schematically illustrates a method 300 for forwarding a voicemail message according to an alternative exemplary embodiment of the disclosure. It should be understood that the steps of the method 300 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 300 can be ended at any time. Some or all steps of this process, and/or substantially equivalent steps, can be performed by execution of computer-readable instructions included on a computer readable medium.

As illustrated in block 302, a VMS 30 can store one or more messages 54, as explained above with reference to block 202 of FIG. 7. As illustrated in block 304, a user or the device 18 can connect to the VMS 30, as explained above with reference to block 204 of FIG. 7. As illustrated in block 306, the VMS 30 can authenticate a user or the device 18 to determine if the user or the device 18 is authorized to access the requested mailbox, as explained above with reference to block 206 of FIG. 7. For the remainder of the illustrated method 300, it will be assumed that the user or the device 18 authenticates successfully to the VMS 30. As illustrated in block 308, the VMS 30 can retrieve one or more messages 54, or portion(s) thereof, for the user or the device 18, as explained above with reference to block 208 of FIG. 7. At block 310, the VMS 30 can receive instructions to forward one or more messages 54, as explained above with reference to block 210 of FIG. 7. As explained above, the method 300 can include designating or determining recipients, designating or determining conversion formats, designating or determining the desired forwarding method, and the like.

At block 312, the VMS 30 can optionally convert a message 54, or a portion thereof, to a desired format, as explained above with reference to block 212 of FIG. 7. At block 314, the VMS 30 can store the message 54 in a memory, for example, the VMS memory 38 or a storage device on the communications network 10 such as a server on the Internet 12. At optional block 316, the VMS 30 can generate a third party access area for retrieval of the converted message 54 by a designated third party. The third party access area can include a link to a file location on a server, a link to a web page that has hyperlinks to the file location on a server, and the like, wherein the file located at the file location includes a file corresponding to the message 54. Alternatively, the third party access area can include a number or extension to which a third party connects to retrieve the message 54, or a special code, password, dial-in number, and the like, for message retrieval. At block 318, the VMS 30 can send a link or retrieval instructions to the recipient designated by the user, for example, a link to the web page generated by the VMS 30, a' password, a dial-in number, a special code for retrieving the message, and the like. The connection information can be sent to the designated recipient as an email, a voicemail message, a text message, a voice call, or in any other desired format. At block 320, the recipient retrieves the message 54, or a portion thereof. Retrieval of the message 54 can include the recipient connecting to the VMS 30 and being authenticated by the VMS 30. The recipient can download the message 54, or a portion thereof, from the VMS 30 or from another location at which the message 54 is stored.

Figure 9:
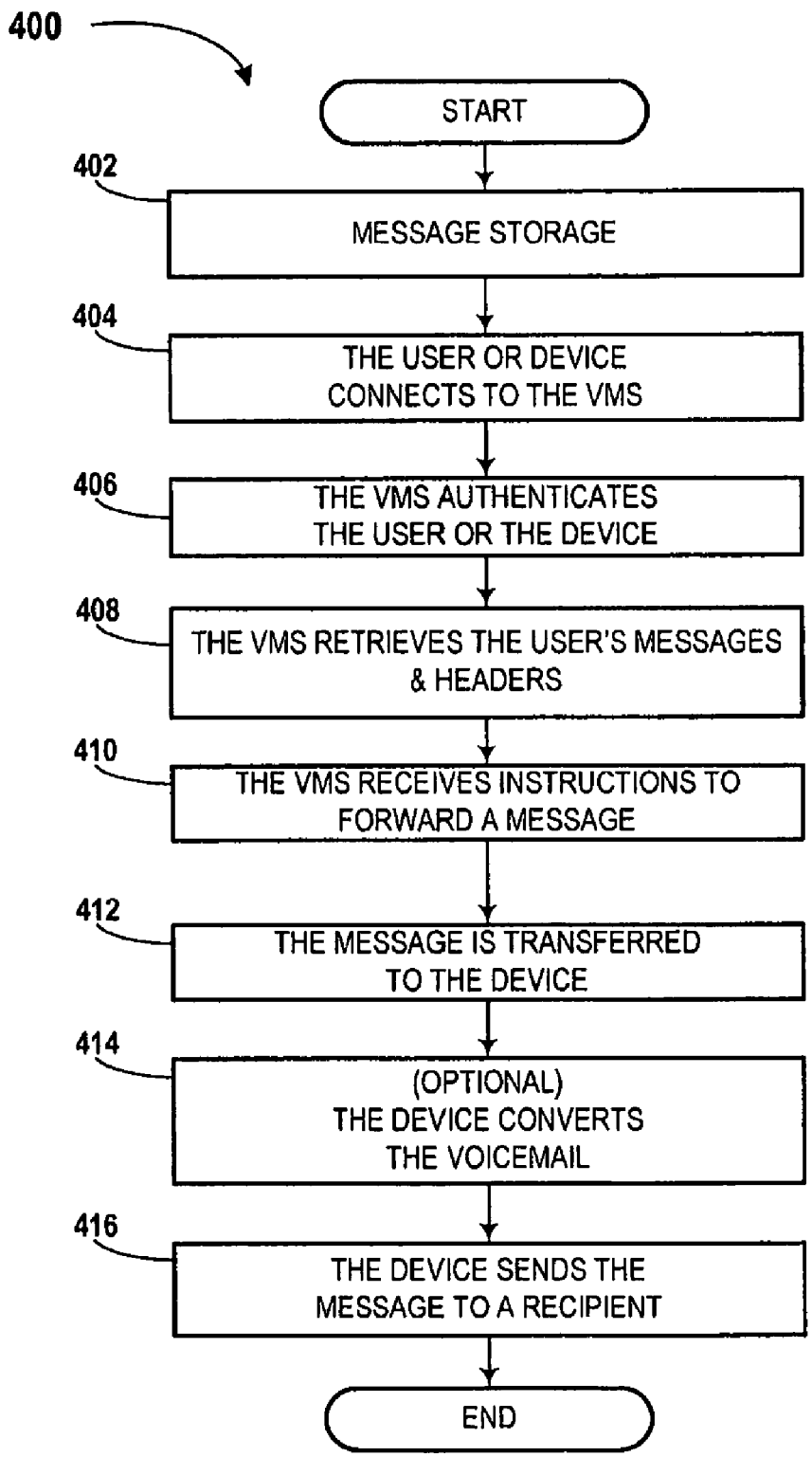
FIG. 9 schematically illustrates a method for storing and forwarding a voicemail message, according to another alternative exemplary embodiment of the present disclosure.

FIG. 9 schematically illustrates a method 400 for forwarding a voicemail message according to another alternative exemplary embodiment of the disclosure. It should be understood that the steps of the method 400 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 400 can be ended at any time. Some or all steps of this process, and/or substantially equivalent steps, can be performed by execution of computer-readable instructions included on a computer readable medium.

As illustrated in block 402, a VMS 30 can store one or more messages 54, as explained above with reference to FIGS. 7 and 8. As illustrated in block 404, a user or the device 18 can connect to the VMS 30, as explained above with reference to FIGS. 7 and 8. As illustrated in block 406, the VMS 30 can authenticate a user or the device 18 to determine if the user or the device 18 is authorized to access the requested mailbox, as explained above with reference to FIGS. 7 and 8. For the remainder of the illustrated method 400, it will be assumed that the user or the device 18 authenticates successfully to the VMS 30. As illustrated in block 408, the VMS 30 can retrieve one or more messages 54, or a portion thereof, for the user or the device 18, as explained above with reference to FIGS. 7 and 8. At block 410, the VMS 30 can receive instructions to forward one or more messages 54, as explained above with reference to FIGS. 7 and 8.

At block 412, the VMS 30 can pass the message 54, or a portion thereof, to the user's device 18. In one embodiment, a data session is established between the VMS 30 and the device 18, and the message 54, or a portion thereof, is downloaded by the device 18. In another embodiment, a data session is established between the VMS 30 and the device 18, and the message 54, or a portion thereof, is uploaded to the device 18. Regardless of the method used to transfer the message 54 to the device 18, the device 18 can receive the message 54. It should be understood that in some embodiments, the device 18 retrieves all voicemail messages 54 upon connection to the VMS 30, or upon review by the user, for example, as described in block 408. It will be understood that if the message 54 is already present on the device 18, the steps described in block 412 may be unnecessary.

At block 414, the device 18 can optionally convert the message 54, or a portion thereof, designated for forwarding. The device 18 can include software, applications, programs, and the like, to carry out the functionality of the VMFA 42. If the message 54 is converted, the message 54, or a portion thereof, can be converted into any desired or designated format, and recipients can be designated by the user or the device 18. It will be appreciated that, as explained above with respect to the method 200 of FIG. 7, the method 400 can include additional processes, for example, designating or determining conversion formats, designating or determining recipients, designating or determining message delivery options, and the like, and that a message 54, or a portion thereof, may not necessarily be converted.

At block 416, the device 18 can send the message 54, or a portion thereof, to the one or more recipients. The message 54, or a portion thereof, can be attached to an email, attached to an MMS message, sent as an SMS message, sent as an email message, and the like. The send format can be.

designated by the user, by the device 18, set by default, determined based upon the recipient, set by the network provider, and the like. Regardless of how the message is formatted, the message can be delivered in a manner substantially similar to normal message delivery. The method 400 can end.

Figure 10:
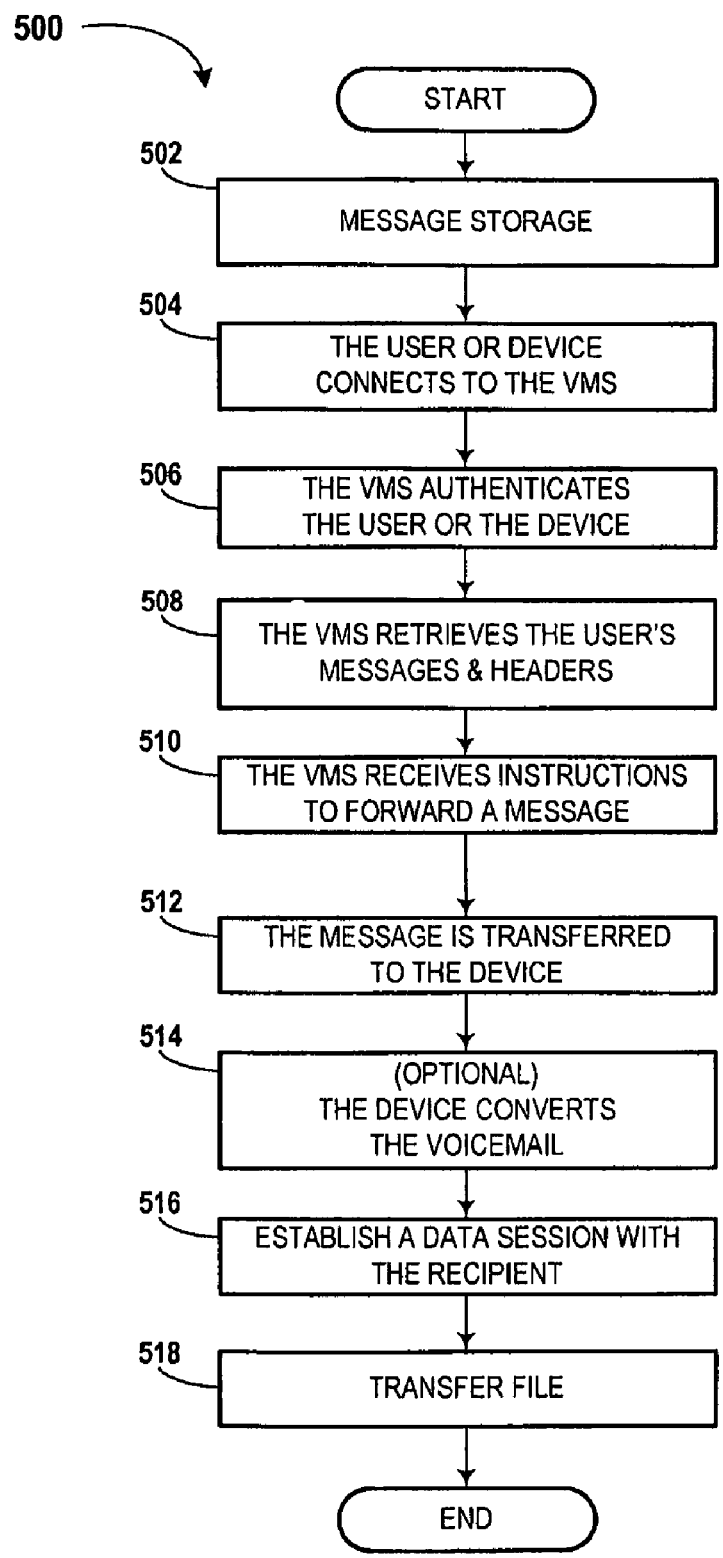
FIG. 10 schematically illustrates a method for storing and forwarding a voicemail message, according to another alternative exemplary embodiment of the present disclosure.

FIG. 10 schematically illustrates a method 500 for forwarding a voicemail message according to yet another alternative exemplary embodiment of the disclosure. It should be understood that the steps of the method 500 are not necessarily presented in any particular order and that performance of some or all the steps in an alternative order(s) is possible and is contemplated. The steps have been presented in the demonstrated order for ease of description and illustration. Steps can be added, omitted and/or performed simultaneously without departing from the scope of the appended claims. It should also be understood that the illustrated method 500 can be ended at any time. Some or all steps of this process, and/or substantially equivalent steps, can be performed by execution of computer-readable instructions included on a computer readable medium.

As illustrated in block 502, a VMS 30 can store a message 54, as explained above with reference to FIGS. 7-9. As illustrated in block 504, a user or the device 18 can connect to the VMS 30, as explained above with reference to FIGS. 7-9. As illustrated in block 506, the VMS 30 can authenticate a user or the device 18 to determine if the user or the device 18 is authorized to access the requested mailbox, as explained above with reference to FIGS. 7-9. For the remainder of the illustrated method 400, it will be assumed that the user or the device 18 authenticates successfully to the VMS 30. As illustrated in block 508, the VMS 30 can retrieve one or more messages 54, or a portion(s) thereof, for the user or the device 18, as explained above with reference to FIGS. 7-9. At block 510, the VMS 30 can receive instructions to forward one or more messages 54, as explained above with reference to FIGS. 7-9. At block 512, the VMS 30 can send the message 54, or a portion thereof, to the device 18, as explained above with reference to block 412 of FIG. 9. At block 514, the device 18 can optionally convert the message 54 as explained above with reference to block 414 of FIG. 9.

At block 516, the device 18 opens a data session with one or more recipient devices. If one or more recipient devices are not able to open a data session, the user or device 18 can be informed and the user or device 18 can terminate the method 500, pause delivery of the message 54, or a portion thereof, to the one or more unavailable recipients, change the delivery method of the message 54, or a portion thereof, and the like. Assuming a data session is successfully established between the user's device 18 and a recipient device, the file can be transferred to the recipient device, as shown in block 518. After delivery of the message 54, the method 500 can end.

While the foregoing description has described the VMS 30 as residing as an application on a communications network 10 and as software on a device 18, it will be appreciated that, as mentioned above, a device 18 can include the user data 48, the VMA 40, and the VMFA 42, all of which can reside in a memory 64 of the device 18. As such, two devices with VMF support can "talk to each other," for example using a peer-to-peer (P2P) session, to provide the functionality needed for the VMS 30. It will be appreciated that this embodiment can provide benefits to the user, but that this embodiment can also require more data and/or voice usage by the called party device 18. User preferences can be used to determine whether the VMS 30 functionality should be employed at the device 18 or at the communications network 10.

While the preceding description has described voicemail messages in the context of audio and text messages, it should be appreciated that the VMS 30 can also process, store, convert, and/or forward (handle) video messages, if desired. In the event that the VMS 30 is configured to handle video messages, many of the same processes described above with respect to video and text messages can be used to handle the messages. For example, a video file can include a video component and an audio component. As such, the VMS 30 can convert the audio file, the video file, or both. The conversion can include a speech to text converter, CODECs, and the like. As such, a user could retrieve a video message as video, audio, text, or a combination thereof, and/or forward the video message as video, audio, text, or a combination thereof.

It must be understood that the illustrated GUIs are exemplary only and other contemplated user interfaces, screen layouts, selection methods, and the like are contemplated, including an embodiment of the VMS 30 that does not provide a GUI at the user's device, the calling party's device, or either device. Furthermore, a selection can be made using various embodiments of softkeys and/or key selections on a mobile or stationary telephone keypad, for example, and is not limited to the illustrated GUI. Additional and/or alternative selector switches and joysticks can be used to select a desired option or icon corresponding to a desired option. Input methods can also include touch screens or voice commands. Any desired screen layout or format can be used, including plain text and icons, for example.

While the preceding description has described forwarding converted voicemail messages, it should be appreciated that a message 54 is not necessarily converted prior to forwarding. For example, a message 54 can be stored in a desired format that can be retrieved by a user and/or forwarded to designated recipients without substantial conversion operations.

The law does not require and it is economically prohibitive to illustrate and teach every possible embodiment of the present claims. Hence, the above-described embodiments are merely exemplary illustrations of implementations set forth for a clear understanding of the principles of the disclosure. Variations, modifications, and combinations may be made to the above-described embodiments without departing from the scope of the claims. All such variations, modifications, and combinations are included herein by the scope of this disclosure and the following claims.

What is claimed is:

1. A system comprising:
a memory having stored therein one or more applications and information related to a third-party recipient device designated by a user of the system; and
a processor configured to execute one or more the applications;
wherein the one or more applications comprise a voicemail forwarding application that, when executed by the processor, causes the processor to
forward a message-retrieval instruction to the third-party recipient device for use by the third-party recipient device to retrieve a voicemail message, and
identify a conversion format by including retrieving the information related to the third-party recipient device from the memory.

2. The system of claim 1, wherein the voicemail forwarding application, when executed by the processor, further causes the processor to convert the voicemail message from a first file format to a second file format according to the conversion format.

3. The system of claim 2, wherein the voicemail forwarding application, when executed by the processor, causes the processor to, in converting the voicemail message, use an algorithm to convert the voicemail message from the first file format to the second file format according to the conversion format.

4. The system of claim 3, wherein the one or more applications further comprise a billing application.

5. The system of claim 1, wherein the one or more applications further comprise user data.

6. The system of claim 5, wherein the user data comprises a greeting and a user preference.

7. A method comprising:
receiving, at a voicemail system, from a user device in communication with a voicemail forwarding application of the voicemail system, message-forwarding instructions to forward a message, intended for a user of the user device, received at the voicemail system from a calling party device;
determining, at the voicemail system, a third-party recipient device designated by the user;
determining, at the voicemail system, a data format, in which to forward at least one portion of the message to the third-party recipient device, including retrieving information related to the third-party recipient device from a memory; and
sending, from the voicemail system, the at least one portion of the message to the third-party recipient device in the data format.

8. The method of claim 7, wherein determining the data format comprises determining an audio data format in which to forward the at least one portion of the message.

9. The method of claim 7, wherein determining the data format comprises determining a text format in which to forward the at least one portion of the message.

10. The method of claim 7, wherein the method further comprises formatting an email message to which the message to be forwarded is attached as a file.

11. The method of claim 7, wherein the method further comprises formatting a multimedia messaging service message to which the message to be forwarded is attached as a file.

12. The method of claim 7, wherein the method further comprises converting to text the message to be forwarded and formatting a short messaging service message including the text.

13. The method of claim 7, wherein the method further comprises establishing a data session with the third-party recipient device for use in transferring the message received at the voicemail system to the third-party recipient device.

14. A method comprising:
receiving, at a voicemail system, user instructions, from a user device in communication with the voicemail system, to allow retrieval of at least one portion of a message by a third-party recipient;
determining, at the voicemail system, a third-party recipient device designated by the user;
determining, at the voicemail system, a data format in which to store the at least one portion of the message, including retrieving information related to the third-party recipient device from a memory; and
sending, from the voicemail system, to the third-party recipient device, retrieval instructions for use in accessing the at least one portion of the message having been stored in the data format.

15. The method of claim 14, wherein determining the data format comprises determining an audio data format in which to store the at least one portion of the message.

16. The method of claim 14, wherein determining the data format comprises determining a text format in which to store the at least one portion of the message.

17. The method of claim 14, wherein the method further comprises formatting a third-party access area for retrieving the at least one portion of the message.

18. The method of claim 14, wherein sending the retrieval instructions comprises sending a hyperlink to a third-party access area.

19. The method of claim 14, wherein sending the retrieval instructions comprises sending a hyperlink to a third-party access area.

* * * * *